July 11, 1961  M. W. THAETE  2,991,756
POWDERED INSECTICIDE APPLICATOR FOR LIVESTOCK
Filed July 18, 1958  2 Sheets-Sheet 1

INVENTOR.
MAX W. THAETE
BY Philip H. Sheridan
ATTORNEY

July 11, 1961

M. W. THAETE 2,991,756

POWDERED INSECTICIDE APPLICATOR FOR LIVESTOCK

Filed July 18, 1958

INVENTOR.
MAX W. THAETE
BY
Philip H. Sheridan
ATTORNEY

United States Patent Office 2,991,756
Patented July 11, 1961

2,991,756
POWDERED INSECTICIDE APPLICATOR
FOR LIVESTOCK
Max W. Thaete, Lakewood, Colo.; Lillian M. Thaete, executrix of said Max W. Thaete, deceased, assignor to Paul V. Horst, Denver, Colo.
Filed July 18, 1958, Ser. No. 749,348
4 Claims. (Cl. 119—159)

This invention relates to powder application and more particularly to self actuated applicators for applying insecticide in dust or powdered form to cattle, sheep and livestock in general.

Stockmen find it necessary to spray or otherwise disinfect their stock to maintain them in a healthy state and to rid them of ticks, lice, horn flies and other common insects or pests that infest the animals and interfere with their growth and general well being. Spraying and other conventional methods of applying insecticides, however, are quite expensive and add a considerable amount to the already high cost of feeding and maintaining the stock. Also, the time involved in rounding up the herd, moving it to a convenient place for spraying and applying the insecticide or pesticide is a factor which makes the chore an onerous and costly one.

In view of the foregoing, several attempts have been made to produce a satisfactory self actuated insecticide applicator which would result in a substantial saving in time and labor as well as money. Most of these applicators were designed to dispense liquid insecticides and pesticides of the type usually sprayed on the stock. Many problems such as spillage, evaporation, even distribution and cost of construction rendered these liquid insecticide dispensers unsatisfactory for the purpose. Attention was also directed toward dispensers for powdered insecticides and pesticides which were much easier to handle than the liquids in self actuated applicators and furthermore powdered insecticide in some instances was required, such as for dairy cattle, in order not to contaminate the milk. Even the dispensers of known dust or powdered insecticides were found, however, to possess several serious disadvantages that rendered them ineffective.

One of these disadvantages was the fact that the small openings in the cartridge of the dispenser which were necessary to retain the powder or dust and prevent it from being discharged prematurely quickly became clogged with wet hair from the cattle or the lanolin of the sheep's wool or other foreign material. Thus, the holes plugged up and rendered the dispenser useless. In this same connection, moisture from the elements caused caking of the dust at or adjacent the holes which in turn clogged the latter.

Another problem was that of obtaining relatively even distribution of the powder over the animal. It was found that holes or apertures large enough to pass the powder freely had a tendency to deposit the powder in high concentrations at widely spaced intervals, thus leaving a great part of the animal relatively free of insecticide. This, of course, is little better than no treatment at all.

It is therefore the principal object of the present invention to provide a self actuated powdered insecticide applicator which contains a novel construction that prevents clogging of the holes with foreign material and yet affords an even distribution of the powder over the animal.

It is also an important object to provide an applicator of the type described which in addition includes means for ensuring operation as a result of caking of the dust even at the distribution outlets.

Further objects of the invention are to provide a self dusting apparatus which is simple and inexpensive, easily filled and maintained, and which affords adequate protection for the stock with a minimum expenditure of time and money.

Additional objects of the self duster of the instant invention are to provide a device which is simple to install, suited for use with any of the conventional and required powdered insecticides and pesticides, and readily arranged to disinfect any of the common stock animals.

Other objects will be in part apparent and in part pointed out specifically hereinafter in connection with the description of the drawings which follows, in which two embodiments are illustrated and in which primed numerals represent similar parts:

Figure 1:
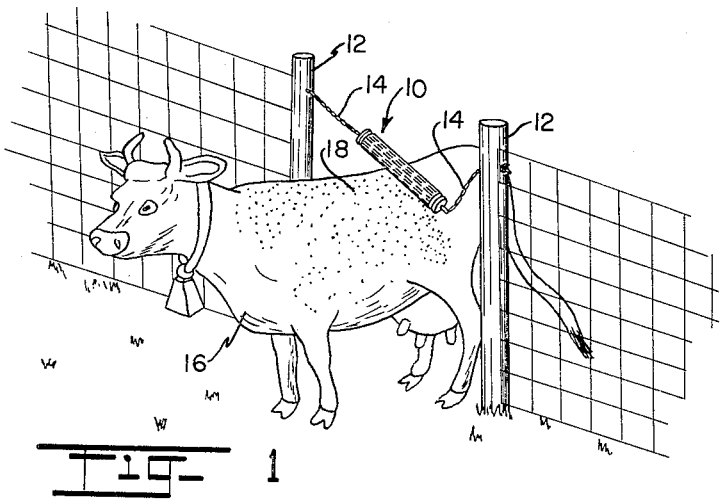
FIGURE 1 is a perspective view showing one form of the self actuated powdered insecticide applicator of the present invention suspended between two fence posts with a cow passing therebeneath.
Figure 2:
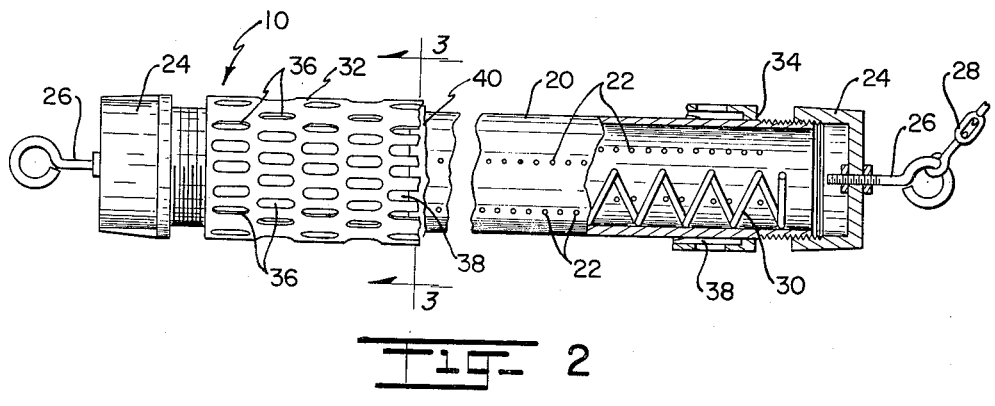
FIGURE 2 is a side elevation view showing the applicator with portions thereof in section and other portions broken away to conserve space and better show the construction.
Figure 3:
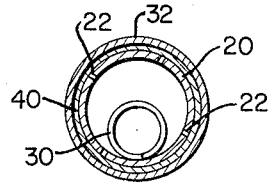
FIGURE 3 is a transverse section taken along the line 3—3 of FIGURE 2.

Referring now to the embodiment of FIGURES 1 to 3 of the drawings, it will be seen that the self actuated powdered insecticide applicator indicated in a general way by numeral 10 is suspended between two upright supports 12 for rotational movement on chains or the like 14. Enough slack is left in the chains to provide ample freedom of movement for the applicator so that it will be bounced and jostled around as it passes along the animal's back. FIGURE 1 shows a cow 16 passing beneath the applicator as she moves through the opening between the upright supports or fence posts as shown, the height of the applicator above the ground being adjusted to correspond with the particular species of animal being dusted. The slack in the chains will, of course, allow for any differences in size between individual animals. As the animal moves underneath the applicator, it rolls, bounces and flops along the back and dispenses the insecticide or pesticide 18 thereon. The length of the chains is preferably adjusted so that the applicator cannot reach either post.

In FIGURES 2 and 3 it will be seen that the applicator 10 includes an inner tube or cylindrical shell 20 provided with a plurality of small openings or apertures 22 positioned along substantially the entire length thereof and all the way around. The particular arrangement of the openings 22 is of no importance other than the fact that they should be fairly evenly distributed over the entire inner tube. The arrangement of the openings shown in the drawing in longitudinal lines angularly spaced from one another was selected because of the simplicity of manufacture. At least one end of the inner tube 20 is provided with a detachable cap 24 which may be removed to load the insecticide powder or dust 18 into the applicator. Both ends of the inner tube have been shown provided with caps 24 threadedly attached thereto and each of the caps contains an eye bolt 26 or the like by which the applicator is attached to the chains.

In FIGURE 2 it will be noted that a swivel 28 is used between the eye bolt 26 and chain 14 to permit relative rotation therebetween. Any other suitable connection which will permit free rotation of the applicator can be used in place of the swivel illustrated and it will be seen that the animal may easily cause rotative, swinging and tilting movement of the unit 10. An agitator 30 is placed inside the inner tube 20 to break up or fragmentize any lumps or cakes of powder that might form and also dislodge any powder that may block the openings and prevent even distribution thereof. The particular helical form of agitator illustrated has been found to be very effective and is constructed of steel or other metal, as are preferably the remaining parts of both embodiments of the applicator. Whatever the design of the agitator, it should be free to move into all parts of the inner tube.

One of the most important single features of the applicators of the present invention is the provision of means to prevent clogging of the small openings 22 in the inner tube with foreign matter of the type described. In the embodiment of the invention found in FIGURES 1 through 3 inclusive, an outer tube 32 is mounted on the inner tube 20 in spaced concentric relation. The outer tube has an annular collar 34 formed at each end which is attached to the outer surface of the inner tube near each end and maintains the outer tube in the desired spaced concentric relation.

Outer tube 32 contains a plurality of openings 36 considerably larger than those openings 22 in inner tube 20. These large openings are distributed over the entire surface of the outer tube as shown in FIGURE 2. The large openings in the outer tube need bear no particular relationship to one another or to the small openings in the inner tube, insofar as arrangement thereof is concerned, although the small openings preferably open beneath one of the solid portions of the outer tube between the large openings. The annular space 38 between the inner and outer tubes is preferably divided into several individual compartments by rings 40, one of which is shown, placed between the concentric tubes and spaced at intervals between the collars 34. These rings add rigidity to the applicator and cause more even distribution of the powder by confining it to the compartments arranged throughout the length of the applicator.

The important relationship between the large openings of the outer tube and the small openings of the inner tube is one of size. The small openings are sized to permit the powder within the inner tube to be discharged easily therethrough when the applicator is buffeted, rolled and otherwise shaken by the animal. They are small enough, however, to prevent the powder from emptying from the inner tube when the applicator is at rest. Holes of this size clog quite easily with hair and oils from the animal's skin unless protected.

The holes of the outer tube, on the other hand, are fairly large and cannot become clogged with hair, fur, dirt and other substances rubbed off the back of the animals being disinfected. The spacing between the outer and inner tubes and the relative arrangement prevents these substances from reaching the small holes in the inner tube which they would otherwise clog. In addition, the outer tube acts to dispense the powder being discharged from the small openings of the inner tube as any concentrations of powder are quickly broken up by the solid portions of the outer tube and dispensed through several openings therein. This action, of course, results in a much more even and effective distribution of the powder over the animal's body. In use, the applicator of the instant invention has been found to produce a fog of powder which is very finely dispersed and distributed uniformly over the back of the animal.

Figure 4:
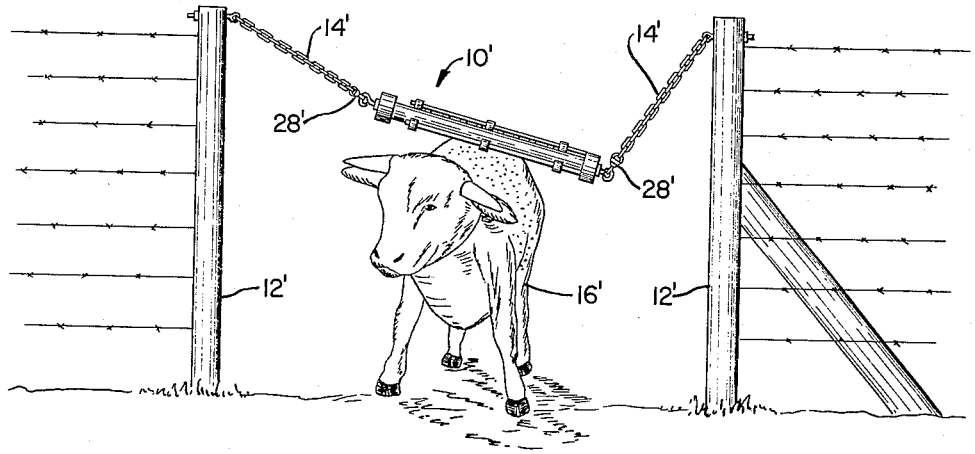
FIGURE 4 is a perspective view similar to FIGURE 1 illustrating the preferred embodiment of this invention.
Figure 5:
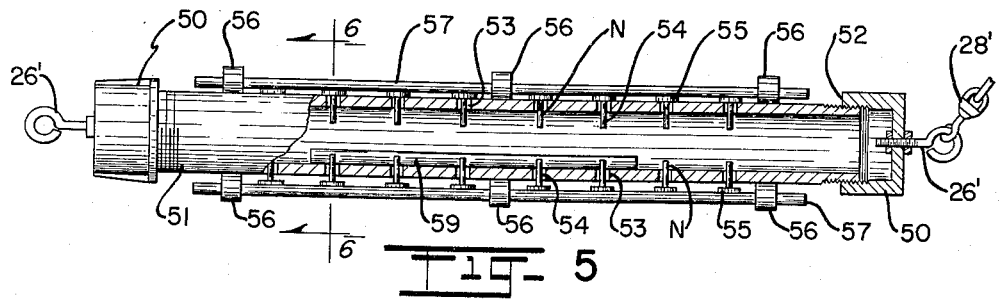
FIGURE 5 is a side elevational view partly in section of the applicator of FIGURE 4.
Figure 6:
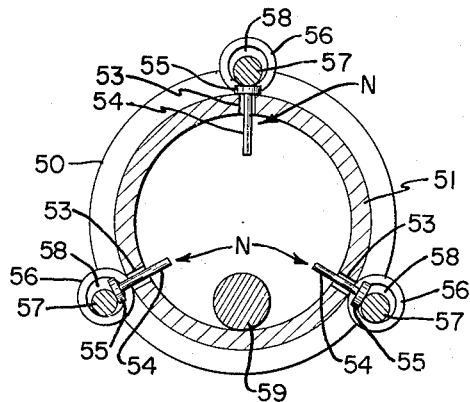
FIGURE 6 is an enlarged, detail view taken along the lines 6—6 of FIGURE 5.

Now referring to FIGURES 4, 5 and 6, there is shown the preferred embodiment of the invention. In this instance the applicator 10' is similarly suspended between fence posts 12' by means of flexible chains or the like 14' and the action of applying dust to the cow 16' should be readily apparent. It should be kept in mind in connection with both embodiments that there is a tremendous amount of actuation including rotative, swinging, tilting and jostling about movements caused by the cow upon the applicator 10' and the flexible chains permit the jostling about, while the swivels such as at 28' of FIGURE 5 permit the rotative movement.

The embodiment of FIGURE 1 has proven satisfactory in many instances but upon moisture accumulating in and at apertures 22, there develops a dust caking which is a disadvantage. The preferred embodiment of FIGURE 4 not only has all of the advantages of unit 10, but means is provided whereby the animal in the field may readily cause uncaking at or in the apertures.

Considering the details of applicator 10' by referring to FIGURES 5 and 6, such includes a cylindrical tube or shell 50 and this tube is closed at both ends by detachable caps 51 which are practically identical to caps 24' of FIGURE 2, each cap including an annular surface 52 that will be referred to hereinafter. Dust or powder is supplied to the interior of tube 51 and there is provided in tube 51 three longitudinal rows of spaced apertures 53, these as illustrated being enlarged and spaced 120 degrees apart and being of a desired and suitable size. The providing of apertures 53 in rows is not to be construed as limiting, nor is the spacing of each aperture in each row, although the arrangement illustrated in the drawings is accurate of the presently commercialized embodiment.

Letter N represents a conventional nail member having a stem 54 smaller than the diameter of aperture 53 through each of which a stem extends and a head 55, the head being of a size larger than the aperture 53 whereby the nail cannot fall into the tube 50. Welded at desired intervals and in rows to the exterior of tube 51 are ring or loop-shaped members 56 and within each of the loops in a row is positioned a metal rod 57. The rod is much smaller than the size of the opening 58 of each loop whereby each rod may move around freely within each loop and also each rod 57 may move longitudinally of tube 51, although the latter action is limited by the annular surfaces 52 and in turn the latter surfaces prevent each tube from being removed from the loops. A rod 57 is provided for each row of apertures 53, but this is not to be construed as limiting as each row of holes 53 could have several rod sections associated therewith. Also each rod is supported by loops 56 such that it will preferably be spaced at least the thickness of head 55 from shell 51 and in operation it becomes farther spaced.

Considering FIGURE 5 and assuming that the bottom of openings 58 is that area most adjacent tube 51 and the top of opening 58 is that area most remote from tube 51, then it will be seen that when a rod 57 is positioned in the bottom of the opening of its supporting loops 58, then it engages the heads 55 of the nails therebeneath to more or less cause them to abut the exterior of tube 51. On the other hand, when a rod 57 is at the top of openings 58, then the nails N therebeneath are adapted to move as shown in FIGURE 6 to a position whereby the heads thereof are spaced from the tube 51.

In operation the cow causes rotative and jostling movement of the applicator and although the nails N cannot enter the interior of tube 51 due to heads 55 or fall exterior thereof due to the rods 57, they continually are agitated by gravity and the action of rods 57 which are in turn moved by the animal. When the heads of the nails are spaced from 51, dust in desired quantities exits from apertures 53 and falls upon the animal and the size of the apertures and number thereof as well as the size of stems 54 has been determined to provide the most efficient and uniform dust distribution to the animal. The relationship of the rods 57 and heads 55 with the apertures 53 obviously eliminates clogging by any foreign matter.

Assuming applicator 10' was installed in a ranch area and there was a heavy rain storm which caused moisture to enter apertures 53 whereby the dust would cake at the apertures and cause a clogging. Upon the weather clearing again the cow would continue actuation and the stems 54 would function to break and fragmentize this caking and cause any unclogging caused by moisture and this is a very important additional feature of this form of the invention. Also the interior of tube 51 is provided with a loosely arranged pipe 59 which functions similarly to agitator 30 of FIGURE 2 and further aids in unclogging or breaking up any caking or packing of insecticide.

In connection with both embodiments of the invention, instead of suspending same between fence posts or the like, each could be readily reduced in size with handle mechanism provided for each whereby a rancher or operator could manually operate the devices by rolling same over the body of all types of livestock. Also, it should be mentioned that insects and lice tend to accumulate at the skin of the animal. In connection with the form of the invention shown in FIGURE 5, as the device is worked back and forth over the animal, the rods 57 tend to roughen up the hair of the animal and this roughing action results in the insecticide powder being worked in to immediately adjacent the skin of the animal to kill insects located at the skin.

From the foregoing description of the many novel and useful features of the self actuated powdered insecticide applicators of the present invention it will be seen that the several useful objects for which they were designed have been achieved. Although the invention has been described in connection with the specific forms thereof illustrated in the accompanying drawings, I realize that certain changes may be made therein by persons skilled in the art without departing from the true scope of the invention and it is my intention that the protection afforded herein shall be limited only insofar as said limitations are expressly set forth in the appended claims.

What is claimed is:

1. An applicator for applying powdered insecticide to animals upon actuation thereof by the animal comprising, a hollow shell adapted to contain powdered insecticide, said shell being closed at both ends and being adapted to be supported for swinging, rotative and tilting movement by the animal with a series of spaced apertures in the shell each of a size to pass the powdered insecticide to the exterior thereof, a corresponding series of stems movable in each aperture and each stem having a head of a size larger than the aperture, an elongate rod for each series of stems with means supporting each rod for free limited movement toward and away from the apertures under the influence of gravity to provide for corresponding movement of the heads for each series of stems inwardly to close the apertures and outwardly to open the apertures for the distribution of powdered insecticide.

2. An applicator according to claim 1 in which the means for supporting each rod is defined by loop-shaped members positioned on the exterior of said hollow shell.

3. An applicator as defined in claim 1 wherein there is provided an agitating member freely movable in said shell upon the latter being moved by the animal for agitating the powdered insecticide.

4. An applicator as defined in claim 3 wherein each end of the shell is provided with a closure, at least one of which is detachable.

References Cited in the file of this patent
UNITED STATES PATENTS

| | | |
|---|---|---|
| 934,571 | Reckards | Sept. 21, 1909 |
| 944,072 | Buffum | Dec. 21, 1909 |
| 1,810,228 | Snyder | June 16, 1931 |
| 2,814,273 | Dickens | Nov. 26, 1957 |